United States Patent [19]

Albrecht et al.

[11] 4,057,078

[45] Nov. 8, 1977

[54] VACUUM SLIDE VALVE

[75] Inventors: Robert J. Albrecht, River Edge; Martin J. Fraunberger, Mahwah, both of N.J.

[73] Assignee: Nabisco, Inc., East Hanover, N.J.

[21] Appl. No.: 663,767

[22] Filed: Mar. 4, 1976

[51] Int. Cl.² ............................................. F16K 11/06
[52] U.S. Cl. ............................. 137/625.2; 137/624.15; 137/246
[58] Field of Search ............ 137/625.21, 625.2, 624.17, 137/624.2, 246, 624.15; 251/251, 253

[56] References Cited

U.S. PATENT DOCUMENTS

| 3,143,141 | 8/1964 | Beck | 137/625.2 |
| 3,200,844 | 8/1965 | Jackson | 137/625.2 |
| 3,372,708 | 3/1968 | Hotchkin | 137/624.2 |
| 3,599,671 | 8/1971 | Leszczynski | 137/625.21 |

Primary Examiner—Alan Cohan
Attorney, Agent, or Firm—Gerald Durstewitz

[57] ABSTRACT

A cam operated slide valve in which a metal plate lies on top of a horizontal stationary metal plate and is moved relative thereto by a two piece adjustable cam wheel. The moveable plate is pivoted to the stationary plate and is formed with a recess in its lower surface. Ports are provided in the stationary plate which are connected by the recess when the valve is in its open position.

4 Claims, 6 Drawing Figures

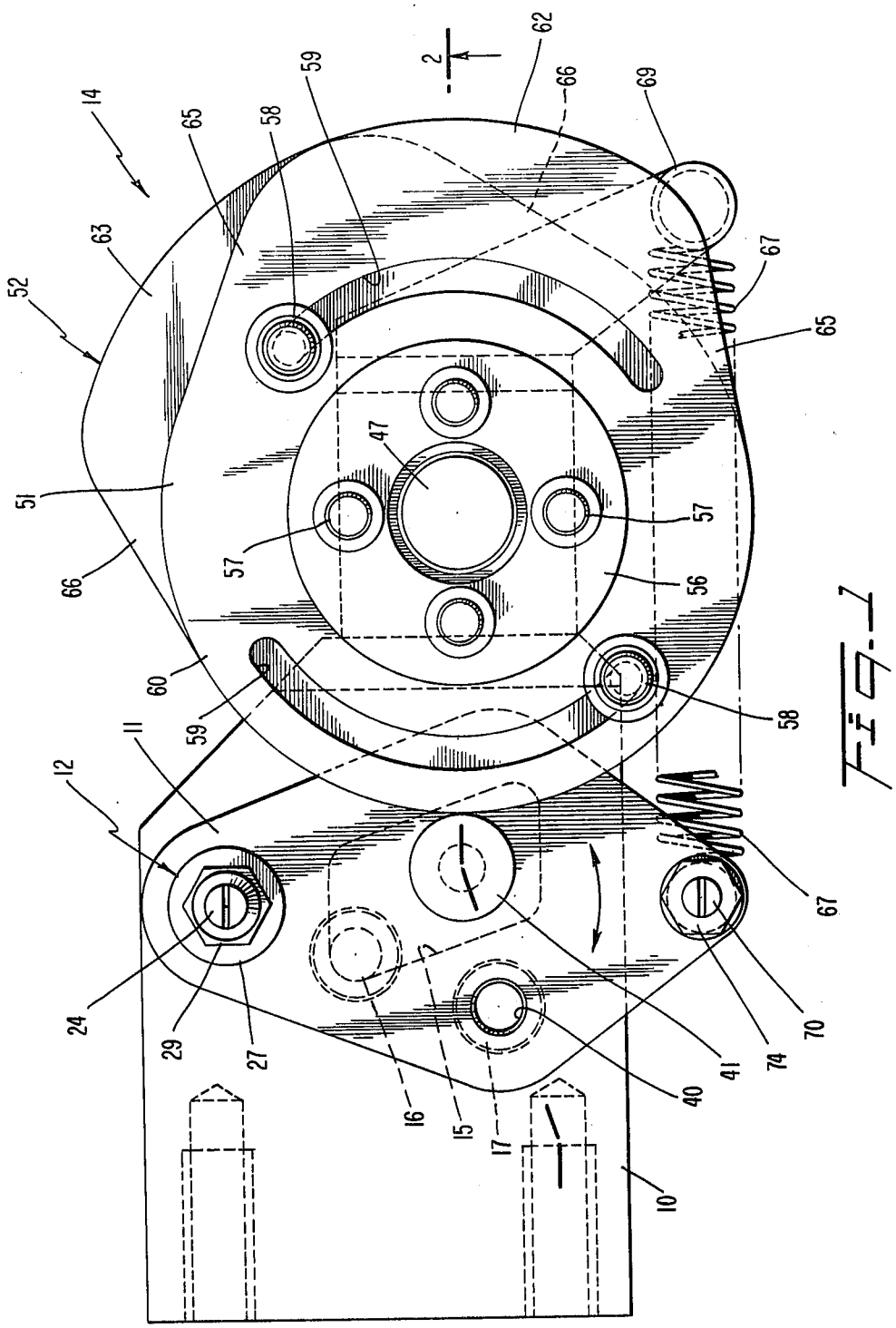

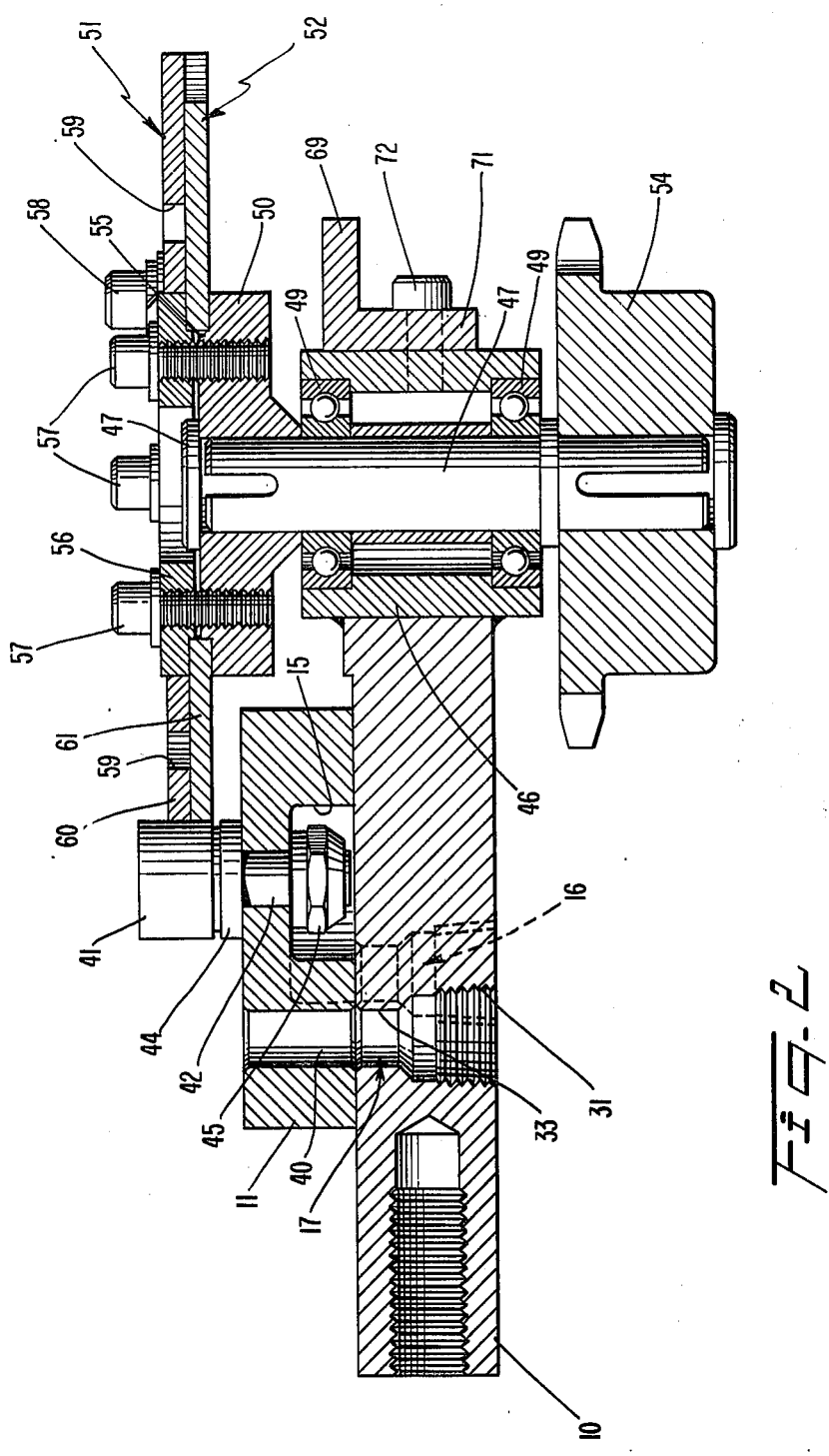

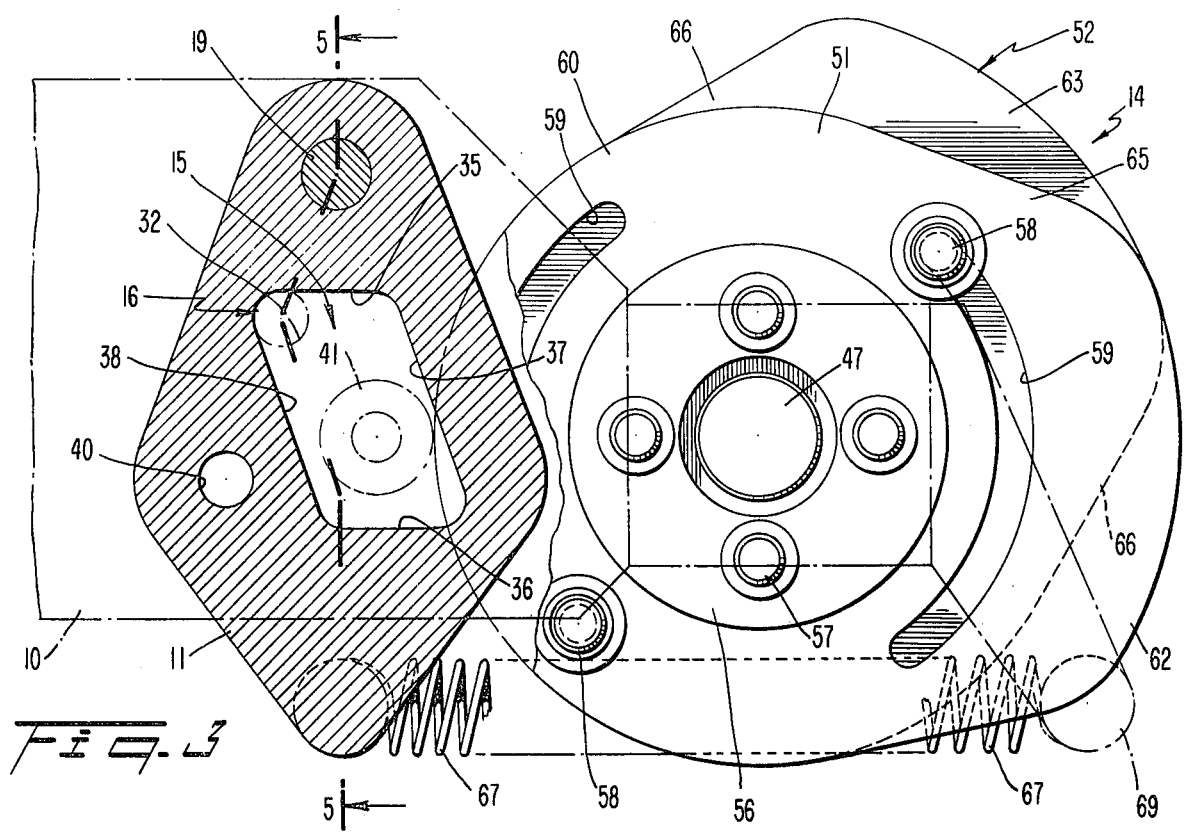
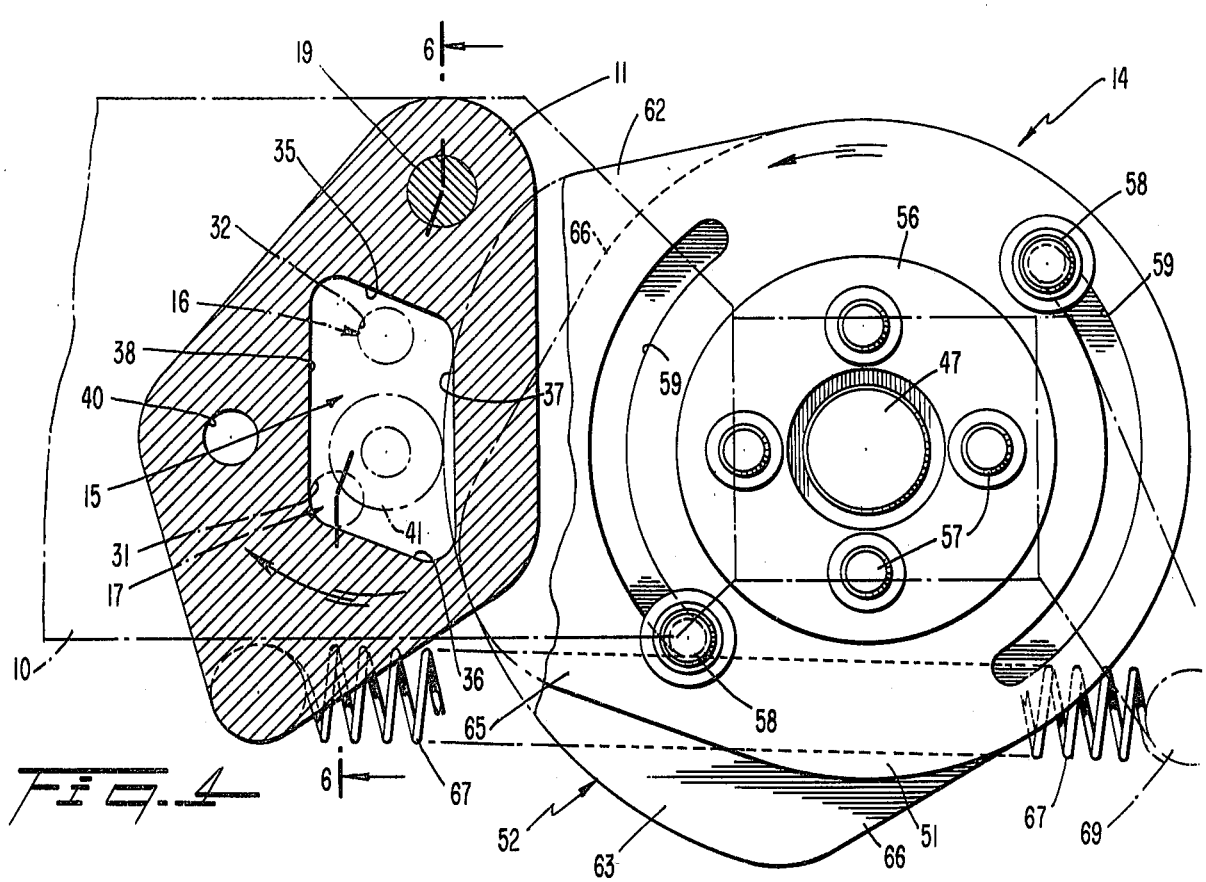

VACUUM SLIDE VALVE

BACKGROUND OF THE INVENTION

The present invention relates to valves, and, more particularly, to vacuum valves.

In many national handling and packaging machines, vacuum is used in one or more portions of the cycle of operation to lift, move, or hold products or packaging materials. The individual vacuum lines are turned on and off in rapid succession throughout each working day for years. In most machines, mechanical elements can be provided with heavy duty bearings and advanced lubrication systems to greatly extend the interval between malfunctions. Conventional air valving, however, tends to be more prone to malfunctioning. The construction of such valves tends to be delicate and easily clogged by the accumulation of dirt. Also, they normally use soft materials at the seal points which tend to wear rapidly and frequently deteriorate with age.

SUMMARY OF THE INVENTION

It is an object of the present invention to provide an improved vacuum valve.

Another object is to provide such a valve which is simple and inexpensive.

Another object is to provide a valve arrangement including an adjustable cam to vary the cycle of the valve.

The foregoing objects are accomplished by providing a vacuum valve comprising an upper plate lying upon a lower plate member, a pair of ports in one of the plates having a pair of ports and the other plate having a recess formed to interconnect the ports, and a mechanism for sliding the upper plate on the lower plate between a position where both ports are aligned with the recess and a position where at least one port is out of alignment with the recess.

BRIEF DESCRIPTION OF THE DRAWINGS

A preferred embodiment of the invention has been chosen for purposes of illustration and description, and is shown in the accompanying drawings, forming a part of the specification, wherein:

FIG. 1 is a plan view of a vacuum valve in accordance with the present invention.

FIG. 2 is a sectional elevational view taken along the line 2—2 on FIG. 1.

FIG. 3 is a plan view partly in section showing the valve in the closed position.

FIG. 4 is a view similar to FIG. 3 showing the valve in the open position.

DESCRIPTION OF THE PREFERRED EMBODIMENT

Figure 5:
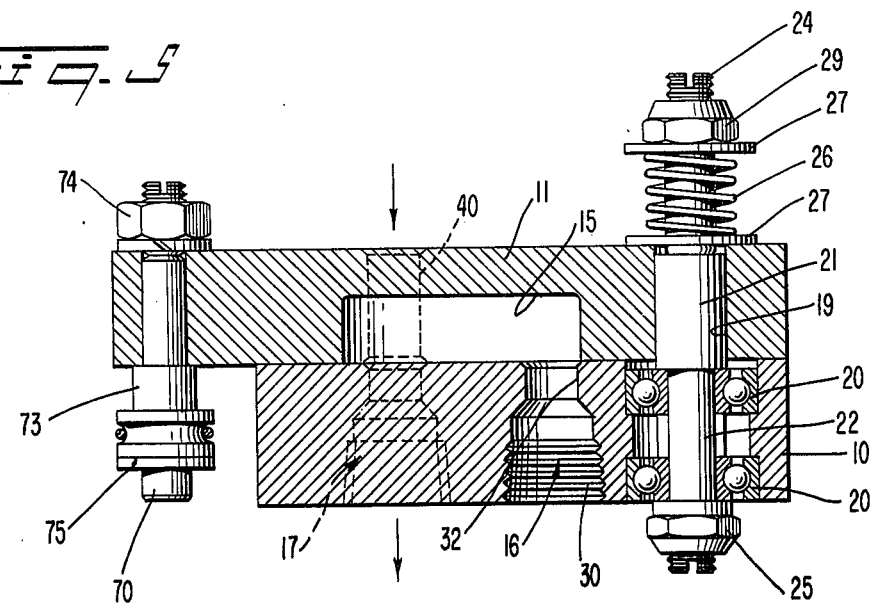
FIG. 5 is a sectional view taken along line 5—5 on FIG. 3.

Referring to the drawings in detail, there is shown a vacuum valve according to the present invention which generally comprises a lower base plate 10, an upper valve plate 11 pivotally mounted to the base plate by a shaft assembly 12, and a cam mechanism 14 for positioning the upper plate 11 to open and close the valve.

The upper plate 11 is generally of diamond shape in plan view and is formed with a recess or cavity 15 in the lower surface thereof. The lower plate 10 is provided with two port passageways 16 and 17 which extend vertically through the plate. The shaft assembly 12 includes a pivot pin 19 which extends through one end of the upper plate 11 and is journalled in a pair of bearings 20 (FIGS. 5 and 6) carried by the base plate 10. The pin has a central portion 21 which extends through the plate 11, and two end portions 22 and 24 which are of smaller diameter. The section 22 extends through the bearings 20 and a nut 25 is threaded to its end. The nut 25 draws the shoulder of the central portion 21 against the upper bearing 20 to secure the pin 19 to the plate 10. The upper end portion 24 is provided with a coil spring 26 positioned between two washers 27. A nut 29 is threaded on the end of the position 24 to compress the spring 26 and thereby press the plate 11 against the plate 10.

The port passageways 16 and 17 comprise threaded lower sections 30 and 31 and upper port sections 32 and 33. Vacuum hoses (not shown) are connected to the threaded sections 30 and 31. The hose connected to the passageway 16 leads to the vacuum source and the hose connected to the passageway 17 leads to the device which employs the vacuum. The passageways 16 and 17 are positioned along a radius line extending from the axis of the pivot pin 19.

Referring to FIGS. 3 and 4, the recess 15 is formed with two parallel walls 35, 36 that are oriented so that each is tangent to one of two concentric circles having the axis of the pivot pin as their center. The passageways 16 and 17 are located along the radius line (mentioned above) so that their port sections 32 and 33 are positioned between the concentric circles. The other two walls 37 and 38 of the recess, are parallel and extend at an angle to the radius line so that the recess is aligned and in communication with only the passageway 16 when the plate 11 is in one of its extreme positions (FIG. 3), and is aligned and in communication with both passageways 16 and 17 when the plate 11 is in its other extreme position (FIG. 4).

Figure 6:
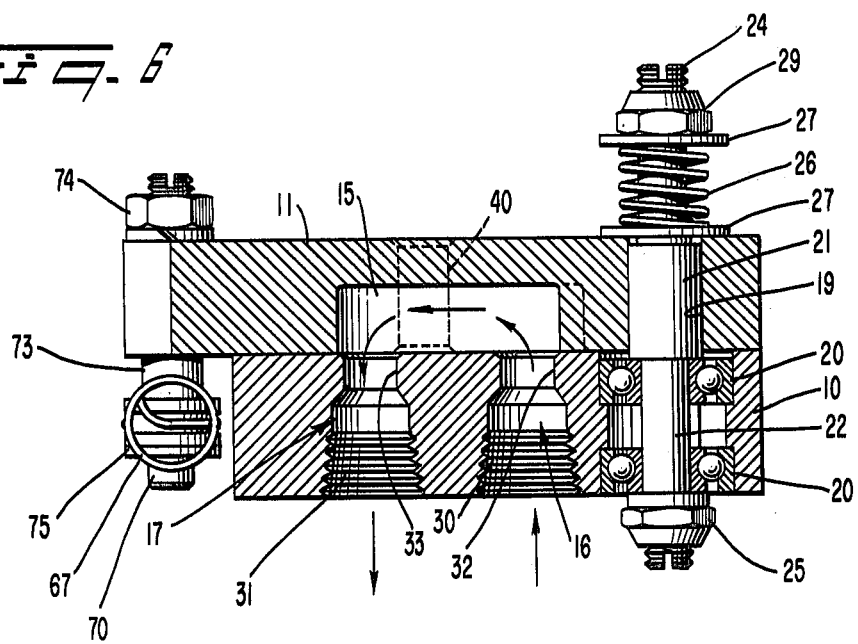
FIG. 6 is a sectional view taken along line 6—6 on FIG. 4.

The plate 11 is provided with a vent passageway 40 which is aligned with the passageway 17 when the valve is in the off position, as shown in FIGS. 3 and 5. The vent passageway allows atmospheric air to flow into the line leading from the passageway 17 to the vacuum operated device to reset the device between successive applications of vacuum.

A cam following roller 41 is mounted on a shaft 42 which extends through the top of the plate 11 into the recess 15. The roller 41 is journalled on a bearing member 44 and a nut 45 is threaded onto the lower end of the shaft 42 to lock the shaft in place.

The cam mechanism 14 includes a block 46 welded to the lower plate 10, a shaft 47 journalled in the block 46 in bearings 49, a hub 50 mounted on the upper end of the shaft 47, upper and lower cam plates 51, 52 mounted on the hub 49, and a gear 54 mounted on the lower end of the shaft 46 for driving the cam mechanism.

The lower complete 52 is an annular member and is seated against a circular shoulder 55 formed on the top of the hub. An annular clamping plate 56 is secured to the hub 50 by bolts 57 to lock the lower plate to the hub. The upper plate 51 is an annular member which abuts the clamping plate and rests upon the lower plate 52. The lower plate is provided with a pair of holes (not shown) which are threaded for receiving bolts 58. These threaded holes are positioned diametrically opposite each other and at radial distance from the axis of the shaft 47 which corresponds to the mean radius of the annular upper cam plate. The upper cam plate 51 is provided with a pair of curved slots 59 which extend in circular arcs. Each bolt 58 passes through one of the slots 59 and the bolts are tightened to clamp the upper cam plate to the lower cam plate in a selected position.

The cam follower roller 41 engages the peripheral edges of the cam plates. The cam plates 51 and 52 are each respectively formed with a small diameter circular portion 60, 61 and a large diameter circular portion 62, 63. A transitional cam section 65 is provided at each end of the portion 62 of the upper plate 51, and a transitional section 66 is provided at each end of the portion 63 of the lower plate 52. The upper cam plate is formed so that the position of the large diameter portion 72 is adjustable between one extreme position in which it is aligned with the lower plate portion 63 and a second extreme position in which it slightly overlaps the portion 73 to provide a large diameter peripheral edge of maximum length.

A coil spring 67, which extends from an arm 69 mounted on the blocks 46 to a pin member 70 mounted on the upper plate 11, holds the roller 41 in contact with the edge of the cam plates. The arm 69 is formed with a flange 71 which is bolted to the block by a bolt 72 as shown in FIG. 2. The pin member 70 is mounted in that corner of the plate 11 which is opposite the corner in which the pivot pin is located. The pin member is provided with a shoulder 73 engaging the lower surface of plate 11 and has a nut 74 threaded on the upper end to lock the member 70 to the plate. The hook end of the spring is seated in a grooved formation 75 carried by the pin member below the shoulder.

The cam mechanism operates on the roller 41 to pivot the valve plate 11 about the pin assembly 12. The plate 11 is formed of oil impregnated bronze to reduce friction as it slides across the top surface of the base plate 10.

To place the valve in operation, the passageway 16 is connected to a vacuum pump, the passageway 17 is connected to a device using vacuum in its operation, and the gear 54 is connected to a driving motor by any suitable means. The vacuum pump connected to the passageway 16 produces a vacuum in the chamber 15 and the air pressure acting on the top surface of the plate 11 presses that plate against the plate 10. The spring 26 also tends to press the plates together. The oil film present on the lower surface of the plate 11 peripheral to the recess 15 acts as a seal against atmospheric pressure flowing between the plates 10 and 11 to the recess 15. Although the valve is disclosed herein with the plate 11 positioned above the plate 10 so that the weight of plate 11 would also aid in providing a seal between the plates, it is to be understood that this invention is not limited to this orientation and the valve will operate satisfactorily regardless of its physical orientation.

During each revolution of the cam mechanism 14, the valve plate 11 is moved between the valve closed position shown in FIG. 3 and the valve open position shown in FIG. 4. The valve is in the closed position when the cam plate portions 60 and 61 are in contact with the roller 41. In this position, the passageway 16 is aligned with the recess 15 and the passageway 17 is aligned with the venting passageway 40. When either of the cam plate portions 62 or 63 are moved into contact with the roller 41, the plate 11 is moved into the valve open position. Both of the passageways 16 and 17 are then in alignment with the recess 15 and a vacuum is produced at the vacuum operated device connected to the passageway 17. The portion of each cycle of operation of the valve, during which the valve is in the open position, is adjusted by changing the rotational position of the cam plate 51 with respect to the cam plate 52.

It can be seen from the foregoing that the present invention provides an improved vacuum valve arrangement which is simple, inexpensive, long lasting and maintenance free, and includes an adjustable operating cam for varying the cycle of the valve.

We claim:

1. A vacuum valve comprising in combination, a first stationary metallic plate member, a second moveable plate member formed of an oil impregnated metallic substance lying on said first plate member, the contacting surfaces of said first and second plate members being smooth and flat, means for pivoting said moveable plate member at one end thereof to said stationary plate member, bores in said stationary plate member being provided with means for connection to a vacuum source and vacuum utilizing mechanism respectively, means providing a recess in said moveable plate member extending inwardly thereof from said contacting surface thereof, a cam follower roller mounted on said moveable plate member, cam wheel means mounted on said stationary plate member parallel to said moveable plate member for cooperating with said cam follower roller, spring means acting upon said moveable plate member to hold the cam follower roller against the outer surface of said cam wheel, said cam wheel being formed to slide said second plate member upon said first plate member between a first position and a second position and means providing a third bore extending through said moveable plate member, said first bore being located to be in fluid flow communication with said recess in both said first and second positions to maintain a vacuum in said recess at all times, said second bore being in communication with said recess in said first position to provide a vacuum at the vacuum utilizing mechanism and being in communication with said third bore in said second position to relieve the vacuum at the vacuum utilizing mechanism.

2. A vacuum valve according to claim 1 wherein said cam follower roller includes a pin extending through said second plate member into said recess, a wheel mounted on said pin on the opposite side of said second plate member from said recess, and a pin locking member on the end of the pin within said recess.

3. A vacuum valve according to claim 2 wherein said cam member includes a pair of stacked cam plates each having a cam surface comprising a circular portion and a portion protruding from said circular portion, said cam follower being positioned to be contacted by each of said cam plates.

4. A vacuum valve according to claim 3 wherein cam means includes a driver shaft journalled in said first plate member, a hub mounted on said shaft, means for locking one of said cam plates to said hub, bolt means extending from said one of said cam plates means providing an accurate slot in the other of said cam plates having the same radial position as said bolt means, whereby said bolt means passes through said accurate slot to permit relative angular positioning of said cam plates.

* * * * *